(12) United States Patent
Hill

(10) Patent No.: US 7,861,443 B2
(45) Date of Patent: Jan. 4, 2011

(54) IDENTIFICATION TAG AND RELEASABLE ATTACHMENT CLIP

(76) Inventor: Robert Hill, 83 Harvard Rd., Bolton, MA (US) 01740

( * ) Notice: Subject to any disclaimer, the term of this patent is extended or adjusted under 35 U.S.C. 154(b) by 16 days.

(21) Appl. No.: 12/166,177

(22) Filed: Jul. 1, 2008

(65) Prior Publication Data
US 2009/0007470 A1    Jan. 8, 2009

Related U.S. Application Data

(60) Provisional application No. 60/947,463, filed on Jul. 2, 2007.

(51) Int. Cl.
    *G09F 3/00* (2006.01)
(52) U.S. Cl. ............... 40/300; 70/330; 40/1.5
(58) Field of Classification Search ........... 40/300, 40/303, 301, 330, 631, 634, 660, 661.05; 206/37.1
    See application file for complete search history.

(56) References Cited

U.S. PATENT DOCUMENTS

| | | | |
|---|---|---|---|
| 4,027,907 A * | 6/1977 | Crepinsek | 292/264 |
| 4,197,665 A * | 4/1980 | Siiter | 40/365 |
| 4,259,798 A | 4/1981 | McConnell | |
| 4,399,910 A * | 8/1983 | Gutentag | 206/0.82 |
| 4,739,566 A | 4/1988 | Smith | |
| 5,522,243 A * | 6/1996 | Kusmiss | 70/330 |
| 5,535,491 A * | 7/1996 | Allport | 24/429 |
| 5,544,391 A * | 8/1996 | Hoffman | 24/16 PB |
| 5,752,335 A * | 5/1998 | Shimogori et al. | 40/300 |
| 6,000,258 A * | 12/1999 | Lesko | 70/460 |
| RE36,544 E * | 2/2000 | Madsen et al. | 292/307 R |
| 6,360,404 B1 | 3/2002 | Mudge | |
| 6,367,426 B1 | 4/2002 | Schaible | |
| 6,497,062 B1 | 12/2002 | Koopman | |
| 6,615,626 B2 * | 9/2003 | Yu et al. | 70/301 |
| 6,713,895 B1 * | 3/2004 | Krapfl | 307/10.1 |
| 6,718,598 B2 * | 4/2004 | Gorman et al. | 24/30.5 W |
| 6,735,894 B2 | 5/2004 | Crusenberry | |
| 7,107,941 B2 | 9/2006 | Chih-Hsin | |
| 7,305,782 B2 | 12/2007 | Olsen | |
| 7,331,088 B2 * | 2/2008 | Pontaoe | 24/614 |
| 7,587,848 B2 * | 9/2009 | Wilson | 40/634 |
| 2003/0033737 A1 | 2/2003 | Bradshaw et al. | |
| 2004/0021313 A1 | 2/2004 | Gardner et al. | |
| 2005/0268864 A1 | 12/2005 | Gallagher et al. | |

* cited by examiner

*Primary Examiner*—Lesley Morris
*Assistant Examiner*—Shin Kim
(74) *Attorney, Agent, or Firm*—Brian M. Dingman; Mirick, O'Connell, DeMallie & Hougee, LLP

(57) ABSTRACT

An identification tag that is adapted to be attached to a collar ring. The tag has a molded tag body that defines a pair of recesses, and a pliable clip having spaced arms that are adapted to be releasably received into the tag body recesses, the clip further adapted to be coupled to the collar ring, to releasably couple the tag body to the collar ring.

8 Claims, 5 Drawing Sheets

FIG. 17
FIG. 18
FIG.19
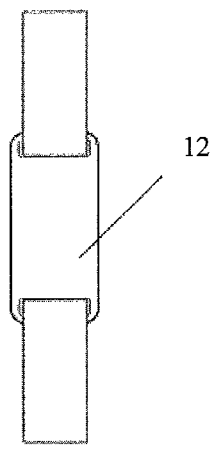
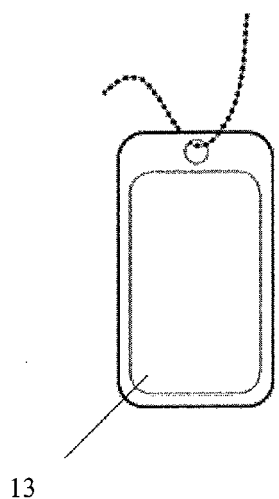
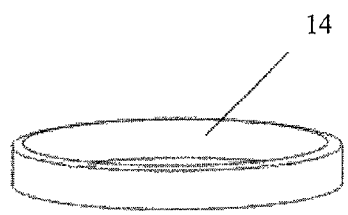

IDENTIFICATION TAG AND RELEASABLE ATTACHMENT CLIP

CROSS REFERENCE TO RELATED APPLICATION

This application claims priority of provisional patent application Ser. No. 60/947,463, filed on Jul. 2, 2007, the entire disclosure of which is incorporated herein by reference.

FIELD OF THE INVENTION

The present invention relates to an identification tag of the type that is typically used for pet identification.

BACKGROUND OF THE INVENTION

The vast majority of pet identification tags in use today are constructed from metal or rigid plastic and attached to the animal's collar by means of a metal split ring or metal S-hook. Additionally, supplemental registration or vaccination tags required by many localities are typically stamped metal tags attached by pet owners to the same metal split ring or metal S-hook attachment device and worn by the animal as a set of tags. In practice, these existing devices present the following disadvantages.

Metal split rings can be very difficult to operate, as the opposing helical rings may require that considerable force be applied in order to separate them far enough apart so that the collar ring and identification tags can be slipped between the two adjacent helical rings. This is typically done with a person's fingernail and can be especially difficult to accomplish with the smaller sized split rings commonly used for pet identification tag applications. Metal S-hooks typically require that the S bend in the hook be opened and closed with pliers or a similar tool, which can pose an inconvenience for some people.

Supplemental tags typically require periodic replacement based on municipal registration or vaccine tag expiration dates. Additionally, identification tags themselves are often replaced on a regular basis due to wear or a change in the owner's address or contact information. As described above, metal split rings and S-hooks can be difficult to use, causing inconvenience for the pet owner each time an expired, updated, or worn tag must be replaced. Additionally, metal S-hooks are weakened each time they are bent and can break or later loosen while in use.

Both metal split rings and metal S-hooks cause the tag body to dangle further from the animal's neck than desirable, as this hardware interface effectively adds length to the tag attachment point. This creates a dangerous situation for an animal should the attached identification tag become entangled with another object, as the animal could be injured trying to free itself or even die from starvation or exposure if entrapped in a remote outdoor location.

Both metal split ring and metal S-hook identification tag attachment devices in combination with rigid plastic or metal identification tags present a possible strangulation danger when attached to an animal's neck collar. When an identification tag affixed to a collar with such a device is rotated beyond approximately 270 degrees, the metal split ring or metal S-hook reaches the limit of its free rotational arc and the collar itself begins to twist, creating a tourniquet effect that can quickly cause injury to the animal or strangulation death. This can occur if the animal's identification tag becomes entangled with a ground level object such as the floor of a pet crate, floor mounted heating and cooling vents or deck boards; and the animal happens to move in a circular motion around the point of entanglement in an attempt to free itself. Several patents have addressed a safety release for entrapped tags through the use of a breakaway buckle or clasp on the animal collar itself; see U.S. Pat. No. 6,360,404 and U.S. Pat. No. 7,107,941, for example. While these may provide a degree of protection for tag entrapment, the vast majority of collars in use today do not employ this feature. Building an identification tag and associated interface system that reduces entrapment risk is beneficial for the millions of standard collars in regular use today.

The use of a split ring or S-hook as an attachment device on a typical collar D-ring in combination with a tag that has a front to rear attachment opening causes the dangling tag to rest in a natural side to side orientation when worn by the animal verses a more practical and visually appealing front to back tag orientation.

When various tags are attached next to one another on the animal's collar with an intermediate attachment device as described above, the metal or hard plastic tag materials strike against one another when the animal moves causing a harsh jangling sound. This undesirable noise can be irritating to pet owners during daily activities such as when walking their dogs or when their pets sleep in close proximity to them. The tag generated noise can also be problematic for animals that are required to function in a quiet fashion or in quiet environments such as working dogs, service dogs, therapy dogs, hunting dogs, show dogs and dogs brought to the owner's workplace. Additionally, a metallic tag noise can cause excited or aggressive behavior in other animals. Existing art for eliminating or muffling the jangling effect of tags call for the wrapping of the tags within an enclosure (U.S. Pat. No. 6,735,894; U.S. Pat. No. 6,367,426; U.S. Pat. No. 4,739,566), or placing the tags in a separate holder assembly (U.S. Pat. No. 4,259,798). Both methods may be effective with respect to noise control but represent very different design approaches and specific execution than does the present invention.

Existing art for the permanent placement of pet identification on non-metal pet tags relates to the use of outer surface printing in the case of non-laminated tag materials, and etched or cut lettering in the case of laminated plastic tag materials, where a contrasting color layer is exposed by etching or cutting through the outer laminate surface to expose the form of the desired lettering in the sub-layer.

SUMMARY OF THE INVENTION

This invention features an identification tag and attachment clip that uses a unique design and combination of materials, allowing the embodiment of many useful features. In the invention's primary application as a pet identification tag; in addition to providing pet-specific information to aid in the recovery of a lost pet, it can be more easily attached to an animal's neck collar by means of the clip device. Additionally, the unique clip design provides a safety benefit as it can shorten the distance from the tag to the collar attachment D-ring by eliminating the need for an attachment hole in the tag in combination with general use attachment hardware devices such as a split ring or S-hook to attach the tag to the collar. The shortened distance resulting from the optimized attachment clip size reduces the likelihood of the tag becoming entangled with another object. Should entanglement still occur, the flexibility of the attachment clip in the present invention provides some degree of protection against twisting collar strangulation, where a traditional fixed metal attachment device such as a split ring or S-hook transmits nearly all of the twisting energy of the distressed animal directly to the collar, creating a potentially fatal tourniquet effect.

Additionally, the tag has a means for attaching supplemental tags such as municipal registration or evidence of vaccination tags directly to the body of the identification tag itself. The use of thin separation washers and a firm mounting design minimizes the undesirable noise that normally results from mounting two or more tags next to one another.

Another feature of the invention is the use of a thermoplastic material for the tag body. The tag body is formed by injection molding a thermoplastic material (e.g., an elastomer that also assists in sound damping) into the desired tag body shape and allowing it to fully cure. The resulting molded tag body is then coated with contrasting color ink layers to facilitate permanent marking of the surfaces, which in this case allows for the application of pet identification information onto the front and/or rear tag surfaces. The tag body is molded, dyed or otherwise coated with a base color layer, followed by coating with a contrasting color layer during manufacture. Laser radiation from a device such as a $CO_2$ laser is then focused on the surface areas to be marked and the outer paint layer is precisely burned away to reveal the contrasting substrate color layer with the customer specified pet identification text or graphic designs. A clear automotive grade commercial clear coat sealer is then applied to the surface for enhanced durability.

Alternatively, thermoplastic resins can be formulated with additives that are not visible to the naked eye within the finished molded component, but become visible when exposed to focused laser radiation, for example from a Nd:YAG laser device, thus eliminating the need to apply substrate color layers. The surface marking in this instance is due to a thermo-chemical reaction to the precisely targeted laser radiation, resulting in a permanent surface level mark within the molded material. Color and contrast levels of the marks are determined by the specific additives used and how they react in a radiated state within the thermoplastic resin formulation. Some additives permanently burn to a darker color that will contrast well with a lighter base material; and others boil, foam and cool to a lighter color that will contrast well against a dark base material. Laser markable thermoplastic materials are commercially available in a variety of compounds and color combinations from many companies; including RTP Company (RTP Company, 580 East Front Street, Winona, Minn., 55987, USA), Evonic Degussa (Evonic Degussa GMBH, Rellinghauser Strasse 1-11, D-45128 Essen, Germany) and Ticona (Ticona, a division of Celanese Corporation, 1601 West LBJ Freeway, Dallas, Tex. 75234-6034 USA). Either laser marking technique may be employed.

The use of laser marking or engraving on a thermoplastic tag for pet tags as well as the additional embodiments described herein results in excellent color contrast, higher lettering resolution and superior wear characteristics as compared with the existing outer tag surface marking methods identified above.

The invention may be accomplished with a tag body made of an injection molded, UV/ilight-stabilized and commercially available thermoplastic material, which allows customer specified information to be etched or marked onto the front and/or rear tag surfaces as described above. Molded within the tag body are recesses with surfaces which dimensionally mate with the collar attachment clip when it is inserted into the tag body, fixing itself in place by way of the interlocking surfaces. There is also a tag attachment clip injection molded from a UV/light-stabilized thermoplastic such as polyacetal, whose properties include high tensile strength, dimensional stability, excellent flexural memory, low water absorption, a low coefficient of friction and good wear properties. Delrin® 327UV NC010 manufactured by DuPont™ Company (DuPont, Wilmington, Del. 19801) is an example of a currently available commercial polyacetal product that possesses these material properties. This attachment clip can be pushed onto a traditional collar ring and then inserted into the tag body's recesses.

The body can include a threaded metal insert which is either press fit or molded into the tag body during manufacture for the purpose of affixing supplemental metal tags such as vaccination or license tags. The insert type to be used employs a 4/40 thread pattern that is distorted slightly in shape as compared to a standard 4/40 machine nut thread to create a higher than normal level of friction against a standard dimension 4/40 machine screw. This self-locking thread design allows precise screw tension adjustment that resists undesirable loosening due to temperature changes, movement or vibration. This type of insert is commercially available, such as Penn Engineering's (Penn Engineering & Manufacturing Corporation, 5190 Old Easton Road, Danboro, Pa., 18916) Molded-In Lock-Thread Insert, product number IBLC-440-8. A removable threaded screw to which supplemental tags can be affixed and then screwed into the threaded insert within the tag body can be included in the invention. This pan head machine screw is made of a nylon material in a 4/40 thread cut and a range of lengths depending on the number of supplemental tags to be attached; minimum length is one eighth inch. This screw is a standard commercially available hardware component available in most retail hardware stores.

There can also be thin #4 sized nylon or fiber separation washers that when placed in front of, between or behind mounted supplemental metal tags, serve to minimize tag interaction noise and wear. Each of these washer types is a standard commercially available hardware component available in most retail hardware stores.

The invention provides a superior means by which identification tags can be affixed to an animal's neck collar. Reasons include that the tag clip can be easily looped onto the neck collar's attachment D-ring by hand without the use of tools as required with an S-hook device and without the inherent difficulty associated with common split ring devices. Also, the identification tag body can then be attached to the tag attachment clip by hand with a minimal amount of force. The clip construction and the tag body openings orient the front of the identification tag and associated information in a more desirable forward facing position on the animal. Further, this tag attachment design reduces the risk of animal injury over conventional tags as the elimination of the intermediate split ring or S-hook allows the tag body to sit closer to the collar itself, reducing the likelihood of it becoming entangled in a fixed object. The tag body and attachment clip are constructed of flexible materials that provide some degree of protection against twisting collar strangulation by distorting and breaking free when a sufficient amount of torque is applied by the twisting force of the animal trying to free itself from an entrapment condition. The tag attachment clip can be easily released from the tag body if desired by applying an even squeezing pressure to the attachment clip arms until the teeth on each side of the tag attachment clip fully release, while simultaneously applying outward pressure on the attachment clip, thus allowing the tag attachment clip to be pulled straight out of the tag body.

The invention also provides a superior means for accommodating supplemental metal tags in combination with animal identification when affixed to an animal's neck collar because supplemental metal tags are attached directly to the back of the identification tag body, eliminating the need to attach them separately to the neck collar or encase them. Supplemental tags are placed on a mounting screw with thin separation washers which minimize tag interaction noise and wear by precisely holding the tags in place while allowing them to rotate freely on the screw shaft. Supplemental tags can be easily installed on, or removed from the identification tag body by the animal's owner via the mounting screw. The identification tag's hanger opening is oriented such that the front of the identification tag and associated printed information faces forward on the animal in plain view, and the lack of supplemental tag enclosures or separate attachment devices provides a neater, more attractive appearance.

BRIEF DESCRIPTION OF THE DRAWINGS

Various other objects, features and advantages of the present invention will become fully appreciated as the invention becomes better understood when considered in conjunction with the accompanying drawings, in which like reference characters designate the same or similar parts throughout the several views, and wherein:

FIG. 17 shows an additional embodiment of the described thermoplastic identification body, with customer-specified identification information laser marked or laser etched onto a slotted identification tag 12 for mounting on a pet collar, luggage strap or shoe lace.

FIG. 18 shows an additional embodiment of the described thermoplastic identification body, with customer-specified identification information laser marked or laser etched onto a military style identification tag 13 worn around one's neck or attached to luggage.

FIG. 19 shows an additional embodiment of the described thermoplastic identification body, with customer-specified identification information laser marked or laser etched onto an information bracelet 14 worn around one's wrist or ankle.

DETAILED DESCRIPTION OF CERTAIN EMBODIMENTS OF THE INVENTION

Figure 1:
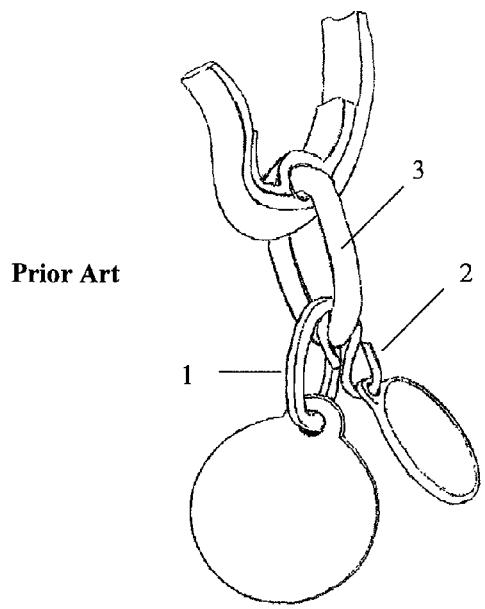
FIG. 1 shows a prior art arrangement of a metal split ring 1 and S-hook 2 attachment devices connecting identification tags to the D-ring 3 of a pet collar.

The components of a first embodiment of the invention, shown in FIGS. 2-10, include an identification tag body 5 molded from an injection molded and laser engravable or laser markable thermoplastic material, with front-facing identification surface 11 and rear-facing identification surface 20. The embodiment further includes tag clip 4 that provides a physical tag connection interface to the pet collar D-ring 3. The supplemental tag holder comprises a removable mounting screw 15 on which supplemental tags 17 are installed, and thin separation washers 16 installed to minimize contact noise and allow free tag rotation.

Design features of the invention include the following. The tag body is designed to connect to the tag attachment clip by pushing the two together, and release only when a specific intentional manual force is applied. This involves applying inward squeezing pressure by hand to the outside of the attachment clip arms 41 and 42 while simultaneously sliding the attachment clip out of the tag body. This combination of forces is very unlikely to occur without purposeful human action.

The direct attachment feature eliminates the need for an intermediate attachment device such as a split ring or S-hook, therefore significantly shortening the distance between the tag body and collar and reducing the chances of the tag becoming entangled in a fixed object when worn by the pet. The distance reduction is the result of a size optimized clip design verses the use of an attachment hole in the tag in combination with general use attachment hardware devices such as a split ring or S-hook to attach the tag to the collar. The typical distance reduction is approximately one sixteenth inch to one half inch depending on the size of the split ring or S-hook device used for the comparison.

The rear of the tag body has a removable and adjustable mounting screw that supplemental prior art tags can be affixed to. While the mounting screw is detached from the tag body, supplemental tags can be placed over the threaded screw shaft with thin washers placed front and/or rear or in between the supplemental metal tags, and the entire assembly can then be screwed into place on the tag body. The threaded insert utilizes a lock thread dimension, allowing precise adjustment of the tag interface tension and preventing self-loosening of the mounting screw. Exchanging the supplemental tags requires simply removing and reinstalling the mounting screw with a screwdriver.

This embodiment of the invention works in the following manner.

Figure 2:
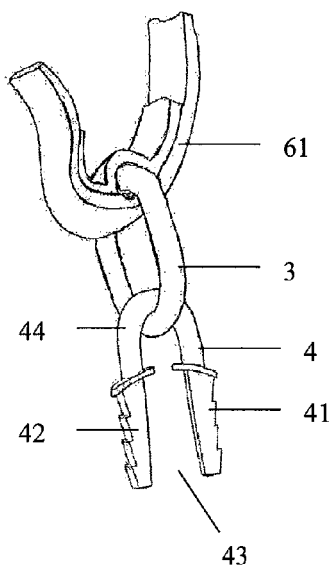
FIG. 2 shows the tag attachment clip 4 used in a first embodiment of this invention installed on the D-ring 3 of a pet collar. Clip 4 defines closed end 44, and open end 43 located between projecting arms 41 and 42.
Figure 3:
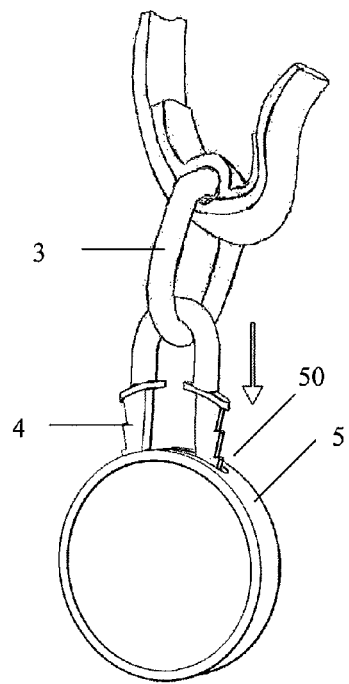
FIG. 3 is a front angle elevation view of the identification tag and the method for installing the tag attachment clip 4 into the tag body 5.
Figure 4:
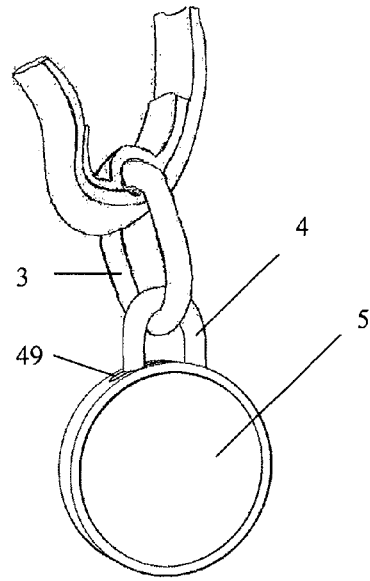
FIG. 4 is a front angled elevation view of the referenced invention showing the tag attachment clip 4 and forward-facing identification surface of the tag body 5.

Tag Installation on Collar using the Attachment Clip:

Referencing FIG. 2, the tag clip is first installed onto an animal's collar 61 by looping the open clip end 43 over the collar's attachment D-ring 3 such that the closed end 44 rests on ring 3. Referencing FIG. 3, once the attachment tag clip 4 is slipped onto the collar attachment D-ring 3, the tag body 5 is pushed onto the clip 4 by inserting the two clip arms 41 and 42 into the recesses 50 and 49, respectively, of the tag body 5. Referencing FIG. 5, the outer surfaces of the arms on the tag clip 4 are serrated—they employ a series of ramped and flat surfaces which are oriented to allow them to easily slide over the dimensionally matched serrations—ramped and flat surfaces 51—within the recesses in tag body 5, and then lock into place once fully inserted. Locking occurs when arms 41 and 42 and tag body 5 surfaces 51 are fully engaged and the opposing flat surfaces prevent the direct release of the tag clip 4 from the tag body 5. Referencing FIG. 4, once the tag clip 4 is firmly snapped into place within the tag body 5, the two joined components will dangle freely from the collar D-ring 3 as one unit.

Figure 5:
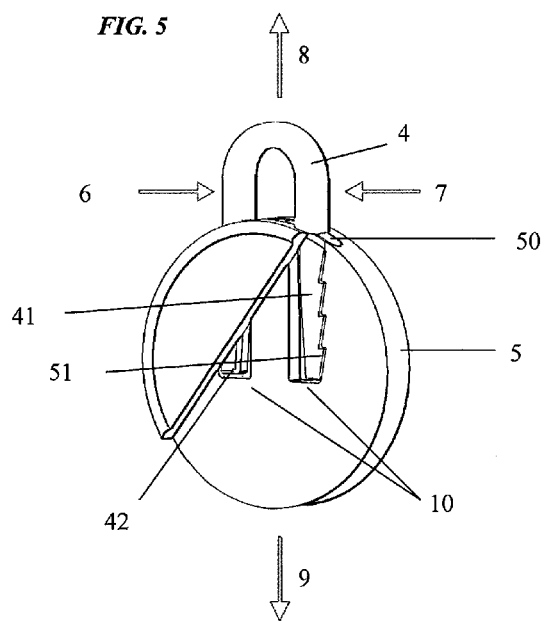
FIG. 5 is a representational partially cross-sectional view of the tag body 5, showing the ramped and horizontal (i.e., serrated) tag clip arm 41 and complementary serrated surface 51 of recess 50 fully engaged and holding the tag in place on the tag clip 4. The same arrangement is used for second leg 42. Release of the two components requires that direct inward squeezing pressure be applied to the clip arms via forces 6 and 7 until the horizontal toothed surfaces of arms 41 and 42 are fully disengaged and simultaneously pulling the two components apart via forces 8 and 9. The size and shape of the recesses within the tag body 5 (recess 50 shown) define sufficient space 10 for the tag clip arms to be compressed towards the center of the tag body, facilitating release from the opposing tag body ramped surfaces.
Figure 6:
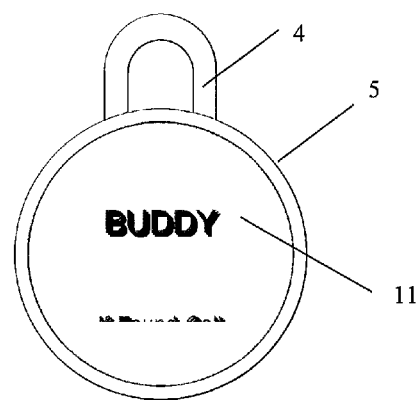
FIG. 6 shows the first embodiment of the described thermoplastic identification body 5 with customer-specified pet identification or retrieval information 11 laser marked or laser etched onto the front facing tag body 5 and the tag clip 4 installed.
Figure 7:
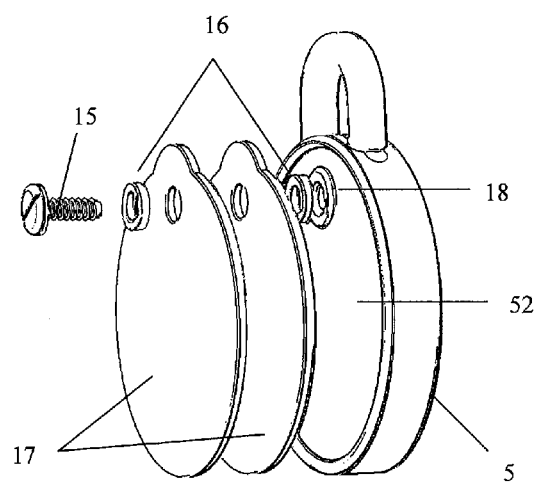
FIG. 7 is a rear elevation exploded view showing the supplemental tag mounting screw 15, separation washers 16, user-provided supplemental tags 17, threaded receiver 18, and rear-facing identification surface 52 of the tag body 5.

Manual Tag Body Removal from Collar:

Referencing FIG. 5, the identification tag body 5 and attachment clip 4 can be easily removed from the neck collar by applying an even squeezing pressure 6 and 7, to the outside of attachment clip arms 41 and 42 until the serrated outer arm surfaces release from their mating surfaces on the tag body recesses, then simultaneously pulling the attachment clip 4 straight out of the tag body 5 with opposing forces 8 and 9. This specific release motion requires human action and cannot be readily duplicated by the actions of the animal while being worn.

Supplemental Tag Installation and Removal:

As shown in FIGS. 7-10, a rear-mounted screw 15 is provided to allow supplemental metal tags 17 to be slipped over it and subsequently threaded into the tag body 5. The tag body 5 incorporates a lock thread insert 18, allowing the shaft of the screw 15 to be threaded into it. The use of a locking thread profile provides sufficient screw friction to allow for a precise tension adjustment and prevent unintended loosening of the mounting screw 15 from the threaded insert 18. Removal is achieved by simply unscrewing the mounting screw 15 with a screwdriver. The use of a precise thread adjustment and retention feature allows the supplemental metal tags 17 to be tensioned to the point where they are closely spaced with little play between them, yet can be swiveled on the screw shaft 15 to expose the rear facing tag identification lettering 20 when desired. While being worn by the animal, the threaded screw 15 will stay firmly in place, and the limited motion of the supplemental metal tags 17 in combination with separation washers 16 prevents tags 17 from rattling against one another.

One or more supplemental metal tags 17 are installed by alternately sliding the tags 17 and their respective separation washers 16 onto the threaded attachment screw 15. Depending on the number of supplemental metal tags to be installed and their thickness, a secure fit is achieved by varying the quantity and thickness of the separation washers 16 installed on the screw 15. Various length screws can also be provided to accommodate different sizes and quantities of supplemental metal tags, including a short screw 15 that caps the insertion hole of the insert 18 if no supplemental tags are to be mounted to the tag body 5.

Once the supplemental metal tags 17 and washers 16 are in place on the screw shaft, the screw 15 is threaded into the receiver 18 situated in the back of the tag body 5 using a standard screwdriver.

Figure 8:
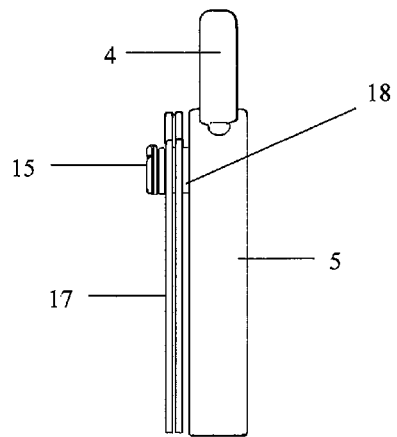
FIG. 8 is a side view of the assembled device of FIG. 7, with two customer-provided supplemental tags 17 installed on the tag body 5 with the tag mounting screw 15 threaded into the lock thread insert 18.
Figure 9:
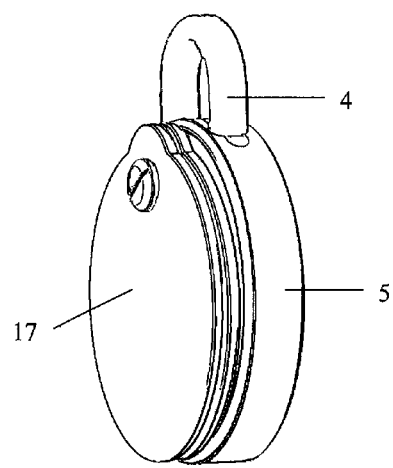
FIG. 9 is a rear angle view of the assembled device of FIG. 8.

FIGS. 8 and 9 show the tag body with two supplemental metal tags 17 screwed in place and ready for use.

Figure 10:
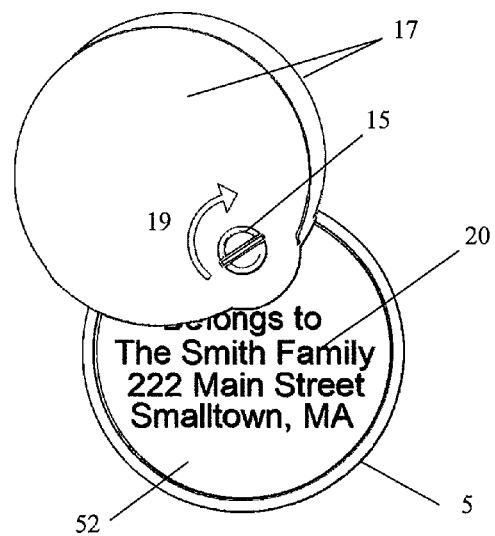
FIG. 10 is a rear view of the assembled device of FIGS. 7-9 with two mounted supplemental tags 17 pivoted in a clockwise direction 19 on the mounting screw 15 to expose the rear face 52 of the tag body 5 and the customer-provided identification information 20, which is laser marked or laser etched onto the tag body 5 surface 52 during manufacture.

FIG. 10 shows two supplemental metal tags 17 pivoted 19 about the mounting screw 15 to reveal the underlying identification information 20 on the rear surface of the tag body 5.

Identification Function:

The primary function of the inventive tag is to provide some means for identifying the wearer and supplying contact or other pertinent information. The tag body is made of an injection molded thermoplastic material that can be marked or etched with this information using a laser light emitting device. In the case of laser marking, a commercially available Nd:YAG laser system such as a LaserStar 3200 (Crafford-LaserStar Technologies, Corporation, One Industrial Court, Riverside, R.I., 02915, USA) would be used to thermo-chemically alter the material pigment to create a contrasting surface color. In the case of laser etching, a commercially available $CO_2$ laser system such as a Universal VersaLaser VLS2.30 (Universal Laser Systems, Inc., 16008 North 81st Street, Scottsdale, Ariz., 85260) would be used to precisely burn away the outer material surface, exposing a contrasting color substrate layer. Laser etching or laser marking can be performed on one or both of the front and rear facing sides of the tag body. The supplemental metal tags can be rotated in place on the tag post if needed to reveal the laser etched or laser marked information on the rear of the tag body or the information on the supplemental metal tags themselves.

ALTERNATIVE OR ADDITIONAL EMBODIMENTS OF THIS INVENTION

Figure 11:
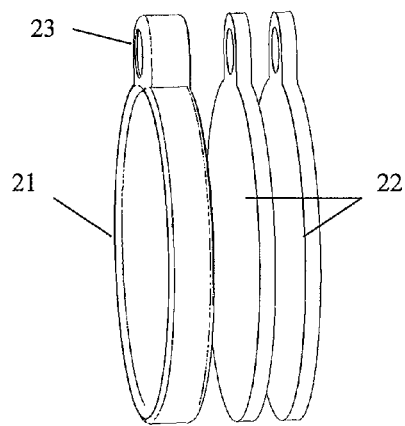
FIG. 11 shows an additional embodiment of an injection molded thermoplastic tag body 21, utilizing a traditionally oriented (front to back) mounting hole 23 for use with a split ring mounting device; and tag sized soft separation washers 22 such as neoprene or rubber for use between supplemental tags mounted on the same split ring device.

The described tag body may be manufactured in a variety of basic geometric or novelty shapes, various colors or color combinations and materials variations such as the use of iridescent thermoplastic resins for improved nighttime visibility. Referencing FIG. 11, supplemental metal tag separation washers 22 may be varied in size, thickness, shape, material type and material hardness; including washers that approximate the actual supplemental metal tag size to provide additional noise dampening either while installed on the described mounting screw or individually mounted between supplemental metal tags when these tags are attached to the collar with traditional mounting devices such as a split ring or S-hook. Referencing FIG. 11, the tag body may use an alternative attachment method, such as a traditional mounting hole oriented either in parallel with 23, or perpendicular to the tag body faces for use with traditional tag attachment devices such as a split ring or S-hook instead of the proprietary tag clip described.

Figure 12:
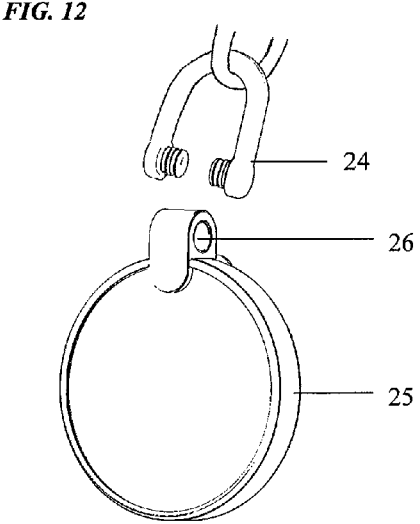
FIG. 12 shows an additional embodiment of an injection molded thermoplastic tag body 25, utilizing a side-to-side oriented mounting hole 26 for use with an alternative clip style 24.
Figure 13:
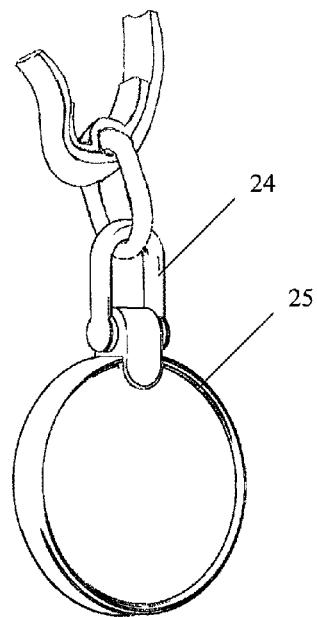
FIG. 13 shows the same tag body 25 and tag clip 24 as illustrated in FIG. 12 but in its fully assembled state.
Figure 14:
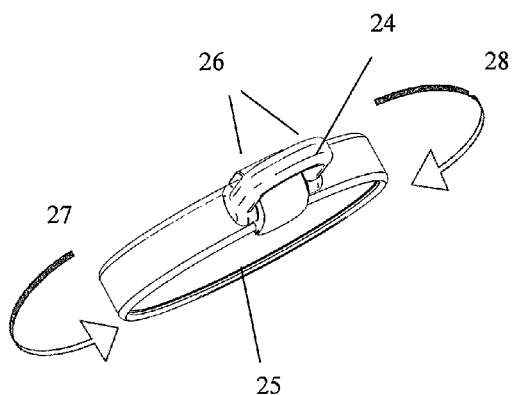
FIG. 14 shows the assembled tag body 25 and tag clip 24 as illustrated in FIGS. 12-13 with a representation of the forces 27 or 28 required to disengage the two components.

As shown in FIGS. 12-14, a tag body constructed of an injection moldable thermoplastic material but incorporating an alternative externally mounted clip design may be substituted for the specified internally attached clip design of the primary embodiment of the invention. In this embodiment, the modified attachment clip 24 is mated to the modified tag body 25 by spreading the clip arms over and into the parallel mounting holes 26. FIG. 13 shows the assembled tag body 25 and clip 24. As shown in FIG. 14, the tag body 25 can be released from the tag clip 24 by twisting the tag body 25 with a rotational force in either direction 27 and 28 while holding the tag clip 24 in a fixed position. Force induced distortion of both the tag clip 24 and the tag body mounting holes 26 will cause the two components to release from another once the component retention threshold is exceeded.

Novelty decorative designs may be laser marked or laser etched onto the tag body independently from, or in combination with pet, owner, wearer, contact, medical or other useful application-specific information. The tag attachment clip ends and associated tag body interfaces may use alternative shapes to vary the installation and release characteristics of the tag clip and tag body, such as fixed hook shaped clip ends that snap in place upon insertion or flexible hook shaped clip ends that pivot into place upon insertion; and each released when inward pressure is applied to the clip arms. The length of the tag mounting screw may be varied to accommodate various supplemental tag sizes as well as the number of tags and separation washers to be installed.

Figure 15:
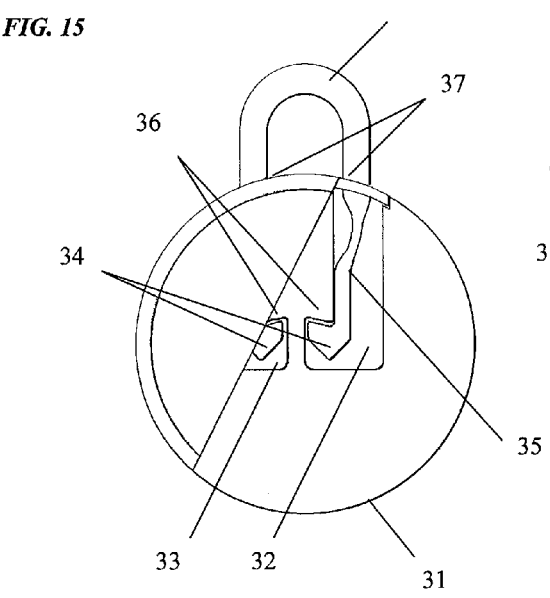
FIG. 15 shows an additional embodiment of an injection molded thermoplastic tag body 31, utilizing hook shaped clip ends that snap into place upon insertion. In this representational partially cross-sectional view of the tag body 31, the tag clip arm 35 and complementary ramped engagement surface 36 of recess 32 is fully engaged and holding the tag in place on the tag clip 30. The same arrangement (dimensionally mirrored) is used for the second leg which is shown mostly obscured. The two internal recesses 32 and 33 allow the tag clip 30 to be inserted via access holes 37 in the top of the tag body 31. The point shaped clip arm ends 34 allow the clip arms 35 to spread apart as inserted. Once fully inserted, the ends of the clip arms 34 snap inward due to the tension present within the spread clip arms 35 and the clip arm ends 34 come to rest in a fully engaged position against the ramp shaped and complementary surfaces 36 of recesses 32 and 33. The now fully inserted clip 30 remains firmly in place within the tag body 31 and resists upward disengagement due to the engagement of the tag arm ends 34 with the ramped tag body surfaces 36.
Figure 16:
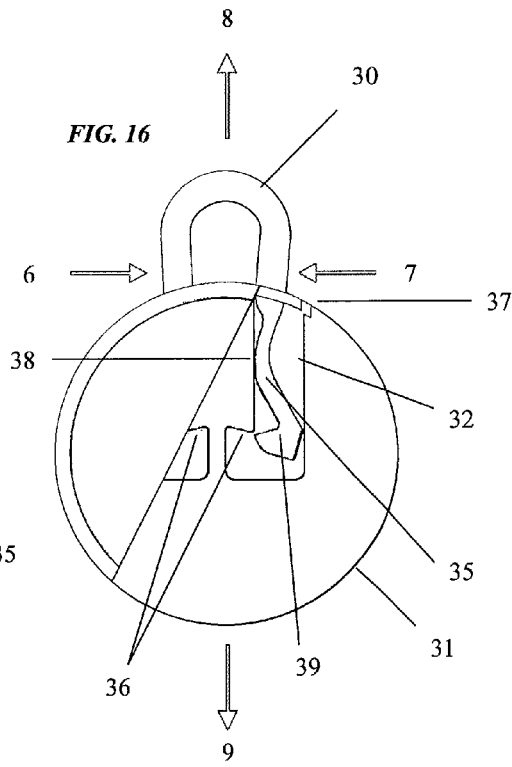
FIG. 16 shows the same representational partially cross-sectional view embodiment as FIG. 15 but under a manual disengagement scenario. Release of the two components requires that direct inward squeezing pressure be applied to the clip arms via forces 6 and 7 until the hook shaped surfaces of the illustrated right arm 39 and obscured left arm are fully disengaged from their locked rest position engaged with surfaces 36. As the clip arms are squeezed together via forces 6 and 7, the representative clip arm 35 is in part substantially flattened against the inside of the inner recess wall 38 and the curve shape of the arm at the intersection point acts as a fulcrum to push the clip arm end 39 to the outside of the recess 32 and clear of the tag body locking surface 36. The size and shape of the recesses within the tag body (cavity 32 shown) define sufficient space for the tag clip arm ends 39 to be displaced outward, facilitating release from the opposing tag body ramped surfaces 36. While forces 6 and 7 are present, simultaneously pulling the two components apart via forces 8 and 9 allows the tag clip 30 to be removed.

FIG. 15 shows an additional embodiment of an injection molded thermoplastic tag body 31, utilizing hook shaped clip ends that snap into place upon insertion, while FIG. 16 shows the arms being removed from the tag body in this embodiment. This embodiment may be less complex to manufacture than the embodiment of FIGS. 1-5 that has serrated arms and tag body recesses, although both perform the same function and operate essentially in the same manner.

FIGS. 17-19 show three alternative forms of identification tags of the invention, which can be made in the same manner and take the physical form of any of the embodiments described above. Tag 12 has slots near either end so that it can be slid on to elongated straps and similar items such as pet collars, luggage straps or shoelaces. Tag 13 has a hole that allows it to be strung on a necklace, like a dog-tag worn by military personnel. Tag 14 is in the form of an ankle or wrist bracelet.

The specified injection molded thermoplastic tag body may be manufactured with variations in size, thickness, hardness and incorporated features, such as a tag that uses a traditional mounting hole and forgoes the described supplemental tag mounting screw. In this embodiment, the unique features of the design include the laser etchable or laser markable thermoplastic material used in this specific application and the associated means for applying information or decorative designs to the tag body as described above. A die cut laser etchable or laser markable thermoplastic tag body may be substituted for an injection molded thermoplastic tag body for embodiments that do not include an integrated tag clip. In addition to pet related tag applications, additional embodiments of the invention incorporating the use of either a die cut or an injection molded thermoplastic base material and associated laser etching or laser marking features are; medical identification tags designed for wear around the neck, wrist or ankle, military style identification tags designed for wear around the neck, identification bracelets designed for wear around the wrist or ankle, identification tags designed for wear on shoe laces, and luggage owner identification tags designed to be placed on luggage handles.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An identification tag that is adapted to be attached to a collar ring, comprising:
   a generally cylindrical molded tag body that defines two generally flat end faces and further defines a pair of closed-end recesses that are close to one another and generally parallel to the end faces and a generally flat, curved tag body side wall between the recesses, the recesses defining enlarged openings where they intersect at the sidewall and that are larger than the portion of the recess just below the opening, the tag body at least in part made from a thermoplastic elastomer; and a pliable plastic clip that is generally "U" shaped, with a closed end that fits loosely over the collar ring and defines a continuous generally smooth and generally flat surface along the inside of the closed end and an open end defined between two generally flat, generally parallel, pliable arms that project from the closed end, the arms each defining a hook at its distal end, and an insertion stop along its length that is wider than the portion of the arm adjacent and distal to the insertion stop, the insertion stops located in the enlarged openings of the recesses to prevent further insertion of the arms into the recesses and thereby define the maximum insertion of the arms into the recesses, the insertion stops spaced from the closed end so as to leave sufficient space between the closed end and the tag body side wall when the arms are fully inserted into the recesses so as to capture the collar ring and provide free space between the collar ring and the closed end of the clip to loosely couple the tag body to the collar ring such that the tag body dangles freely from the collar ring, to releasably couple the tag body to the collar ring while allowing free movement of the tag body that is coupled to the collar ring via the clip;

wherein the tag body recesses are generally slotted, and are slightly larger than the clip arms so that the clip arms can be moved laterally within the recesses during both coupling and decoupling of the clip to the tag body, and wherein the tag body defines two transverse cavities, one communicating with each slotted recess and complementary to the hooks on the clip arms and located such that when the clip arms are pushed into the body recesses up to the insertion stops, the hooks seat in the transverse cavities, to releasably lock the clip to the body; wherein the clip can be released from the tag body without damage to either the clip or tag body by simultaneously squeezing the arms together to thereby release the hooks structures from the transverse cavities and thus release the arms from the recesses, and pulling the clip and the tag body away from one another to withdraw the arms from the recesses.

2. The identification tag of claim 1 in which one or both of the tag body end faces are one color, and below one or both end faces there is a sub-surface layer that is a different color, to facilitate laser engraving.

3. The identification tag of claim 2 further comprising engraving on one or both end faces, the engraving passing through the one color on the engraved end face and reaching the different color below the end face, to present contrasting color engraving.

4. The identification tag of claim 1 in which one or both of the tag body end faces comprise a material that can be marked by a change in surface color when exposed to laser light.

5. The identification tag of claim 1, further comprising a mounting screw adapted to be removably coupled to the tag body, and one or more supplemental tags adapted to be mounted to the screw.

6. The identification tag of claim 5 further comprising one or more thin washers adapted to fit over the mounting screw, for placement between supplemental tags.

7. The identification tag of claim 5 in which the tag body defines an internally threaded insert located in the body, for accepting the screw, wherein the threads of the insert are slightly mismatched to the threads of the screw to increase the friction between the screw and the insert, where the friction fit facilitates precise tension adjustment of the mounting screw to prevent screw self-loosening, and wherein a supplemental tag is held by the mounting screw with sufficient free play to allow rotation of the supplemental tag about the screw shank.

8. The identification tag of claim 1, further comprising:
a mounting screw adapted to be removably coupled to the tag body via a friction fit;
one or more supplemental tags adapted to be mounted to the screw; and
one or more thin washers adapted to fit over the mounting screw, for placement between or adjacent to the one or more supplemental tags;
wherein the friction fit facilitates precise tension adjustment of the mounting screw to prevent screw self-loosening, and wherein the supplemental tags are held by the mounting screw with sufficient free play to allow rotation of the supplemental tags about the screw shank.

* * * * *